(12) United States Patent
Cotarmanac'h et al.

(10) Patent No.: US 7,398,543 B2
(45) Date of Patent: Jul. 8, 2008

(54) METHOD FOR BROADCASTING MULTIMEDIA SIGNALS TOWARDS A PLURALITY OF TERMINALS

(75) Inventors: Alexandre Cotarmanac'h, Rennes (FR); Dominique Curet, Thorigne-Fouillard (FR); Michel Veillard, Bruz (FR)

(73) Assignee: France Telecom, Paris (FR)

( * ) Notice: Subject to any disclaimer, the term of this patent is extended or adjusted under 35 U.S.C. 154(b) by 458 days.

(21) Appl. No.: 10/483,689

(22) PCT Filed: Jul. 12, 2002

(86) PCT No.: PCT/EP02/08673

§ 371 (c)(1),
(2), (4) Date: Jul. 9, 2004

(87) PCT Pub. No.: WO03/021963

PCT Pub. Date: Mar. 13, 2003

(65) Prior Publication Data

US 2004/0261028 A1    Dec. 23, 2004

(30) Foreign Application Priority Data

Jul. 13, 2001    (EP) ................................. 01460046

(51) Int. Cl.
*H04N 7/173*    (2006.01)
(52) U.S. Cl. .............................. 725/93; 725/90; 725/101
(58) Field of Classification Search ................. 715/723; 725/91, 93–98, 101, 103; 709/217–219, 709/224, 225, 234, 235; 370/230, 235, 437, 370/485, 486

See application file for complete search history.

(56) References Cited

U.S. PATENT DOCUMENTS

| 5,353,283 | A | * | 10/1994 | Tsuchiya ..................... 370/392 |
| 5,414,455 | A | * | 5/1995 | Hooper et al. ................ 725/88 |
| 5,477,263 | A | | 12/1995 | O'Callaghan et al. .......... 348/7 |
| 5,576,843 | A | | 11/1996 | Cookson et al. ............... 386/97 |
| 5,600,378 | A | * | 2/1997 | Wasilewski ................. 348/468 |
| 5,629,732 | A | * | 5/1997 | Moskowitz et al. ......... 725/102 |
| 5,633,871 | A | * | 5/1997 | Bloks ......................... 370/471 |
| 5,721,829 | A | * | 2/1998 | Dunn et al. ................... 725/87 |
| 5,771,435 | A | | 6/1998 | Brown ......................... 455/5.1 |
| 5,781,227 | A | * | 7/1998 | Goode et al. .................. 725/32 |
| 5,822,530 | A | | 10/1998 | Brown .................... 395/200.49 |
| 5,864,542 | A | * | 1/1999 | Gupta et al. ................. 370/257 |
| 5,873,022 | A | * | 2/1999 | Huizer et al. ............... 725/100 |
| 5,892,915 | A | * | 4/1999 | Duso et al. .................. 709/219 |
| 6,012,091 | A | * | 1/2000 | Boyce ........................ 709/219 |

(Continued)

FOREIGN PATENT DOCUMENTS

WO    WO 00/38427    6/2000

*Primary Examiner*—Victor R Kostak
(74) *Attorney, Agent, or Firm*—Westman, Champlin & Kelly, P.A.

(57) ABSTRACT

The invention regards a method for broadcasting multimedia signals towards a plurality of terminals as a data flow comprising successive packets, being organised into sessions, a session comprising a set of packets forming a whole, at least some of said sessions being transmitted under several versions, corresponding to different starting moments. According to the invention, such a method implements a mechanism for merging versions of a same session, so that at least two versions starting at different moments use, at first, session portions which are peculiar to them, and, subsequently, a shared session portion.

12 Claims, 6 Drawing Sheets

U.S. PATENT DOCUMENTS

| | | | |
|---|---|---|---|
| 6,026,446 A | 2/2000 | Ostrover et al. | 709/247 |
| 6,061,504 A * | 5/2000 | Tzelnic et al. | 709/219 |
| 6,263,504 B1 * | 7/2001 | Ebisawa | 725/101 |
| 6,363,207 B1 * | 3/2002 | Duruoz et al. | 386/68 |
| 6,512,882 B1 * | 1/2003 | Teunissen | 386/70 |
| 6,598,228 B2 * | 7/2003 | Hejna, Jr. | 725/91 |
| 6,665,266 B1 * | 12/2003 | Brunheroto et al. | 370/232 |
| 6,751,802 B1 * | 6/2004 | Huizer et al. | 725/90 |
| 6,788,882 B1 * | 9/2004 | Geer et al. | 386/116 |
| 6,859,839 B1 * | 2/2005 | Zahorjan et al. | 709/231 |
| 6,888,848 B2 * | 5/2005 | Beshai et al. | 370/474 |
| 6,892,391 B1 * | 5/2005 | Jones | 725/143 |
| 6,938,268 B1 * | 8/2005 | Hodge | 725/93 |
| 6,988,278 B2 * | 1/2006 | Gomez | 725/101 |
| 6,993,788 B1 * | 1/2006 | Lawrence et al. | 725/102 |
| 7,058,721 B1 * | 6/2006 | Ellison et al. | 709/231 |
| 7,095,945 B1 * | 8/2006 | Kovacevic | 386/12 |
| 7,237,254 B1 * | 6/2007 | Omoigui | 725/94 |
| 7,260,115 B1 * | 8/2007 | DeFord | 370/475 |

\* cited by examiner

METHOD FOR BROADCASTING MULTIMEDIA SIGNALS TOWARDS A PLURALITY OF TERMINALS

CROSS-REFERENCE TO RELATED APPLICATION

This application is a Section 371 National Stage Application of International Application No. PCT/EP02/08673 filed Jul. 12, 2002 and published as WO 03/021963 on Mar. 13, 2003, in English.

STATEMENT REGARDING FEDERALL SPONSORED RESEARCH OR DEVELOPMENT

Not applicable.

THE NAMES OF PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION (a) Field of the Invention

The invention regards broadcasting of multimedia presentations, or signals (such as MPEG-4 presentations), in a broadcasting system providing for random access to a presentation (e.g. MPEG-2).

To allow such a random access, a given presentation has to be broadcast several times, so that several terminals can get the beginning of a presentation at different instants.

Broadcasting MPEG-4 presentations over MPEG-2 transport channels has recently been described in the Amendment 7 to MPEG-2 system.

However, it appears that this Amendment 7 is not sufficient, and requires being updated. The invention try and build MPEG-4 presentations then to see whether we could achieve or not sending them according to Amendment 7. This has lead us to point out here and there some functionality that was left aside or impossible to be efficiently handled.

We tried then to modify as minimally as possible Amendment 7 so as to be able to achieve a complete transmission of an MPEG-4 presentation. This process has been incremental and this document tries to sum up both what can't currently be done in terms of unavailable functionality and our conclusions so as to encompass complete MPEG-4 functionality in the broadcast of MPEG-4 presentations over MPEG-2 transport channels. (In the following lines, MPEG-2 will mean MPEG-2 transport.)

(b) Description of Related Art

1 Prior art: Audit of Amendment 7.

1.1 Implications on MPEG-4 Elementary Streams.

One feature of MPEG-2 is that it enables random access to a presentation. Let us focus on the implications of this when transmitting an MPEG-4 presentation according to MPEG-2.

Most current MPEG terms are defined in Annex 1.

An example of MPEG-4 presentation is given in Annex 2.

Annex 3 relates to MPEG-4 over MPEG-2 mapping according to prior art.

1.1.1 BIFS ES.

Assumption: Random access to a presentation provides two different users with the same presentation.

Assertion: Access units of a BIFS Command ES that are not RAP should not modify the scenegraph structure.

Reason: Otherwise two different users don't have the same presentation at the same point in time. More precisely: since there is random access to the presentation, we can assume there is a RAP AU after such structural modification. The RAP is necessarily a SceneReplace, and the SceneReplace is the modified scenegraph. Consequently the two users don't experience the same presentation.

Conclusion:

a) Updates are only used for scene structure construction and not for presentation purposes. Thus presentations can't be very dynamic. Many MPEG-4 presentations can't be transmitted over MPEG-2. Cartoons, for instance, would not be properly handled.

b) Even in the case of a static presentation, this implies that resources are available or will be available in a very short time which is not possible due to bandwidth limitations if the presentation is a large one. This will result in poor quality presentations (missing images that will pop up some time later, . . . )

1.1.2 OD ES.

Assumption: Random access to a presentation provides two different users with the same presentation.

Assertion: Access units of OD ES that are not RAP should not modify the stream structure.

Reason: Otherwise two different users don't have the same presentation at the same point in time. (see BIFS)

Conclusion: Since OD do not imply modifications in the presentation, this does not alter the presentation.

1.1.3 JPEG, MPEG-J

Assertion: JPEG and MPEG-J have to be sent in PES.

Reason: see Amendment 7 only BIFS & OD can be carried in sections.

Conclusion:

a) Existing error detection mechanism in sections can't be used. It can be critical to know if a JPEG or an MPEG-J AU or corrupted or not.

b) Behaviour of an MPEG-4 terminal that receives duplicate Access Units for JPEG or MPEG-J is not specified. (or not allowed)

1.1.4 Audio & Video

Assertion: Audio and Video have to be sent in PES.

Reason: see Amendment 7 only BIFS & OD can be carried in sections.

Conclusion:

a) Audio "jingles" and "beeps" as well as "video clips" can't be properly handled b) Behaviour of an MPEG-4 terminal that receives duplicate Access Units for Audio, Video is not specified. (or not allowed)

1.2 Some Remarks.

In normal use-cases, we want users to experience the same visual animations in part of the presentation and not for others. Amendment 7 limits the scope of MPEG-4 presentations to an almost static BIFS scene and streamed audio and video. Applications such as cartoons, lightweight ads could not be properly handled.

1.3 Section Versioning.

MPEG-2 allows to give a version number to sections. However the semantics of version_number is signalling a state change if it is incremented.

With the RAP mechanism mentioned above, this does not allow using the update mechanism provided by MPEG-4. As a matter of fact, a session that begins will take the first available section and then incrementally all next version-numbers. This allows a very limited and complicated way of dealing with the update mechanism.

1.4 US-A-5 477 263

This document discloses a video distribution technique, which can be implemented in TIPEG-2 and which also provides fast forward, fast reverse and channel pause functionalities to the user. Such functionalities are achieved by memorizing several versions having staggered starting times of a given program. A pointer to the program which should be decoded for presentation to a given user is also memorized. When a user indicates that he requires a special function, the pointer is changed to point to a program with a different starting time.

A drawback of this technique is that it is resource-consuming, since it requires that several versions of several different programs be stored and handled at the same time.

SUMMARY

2 Presentation of the Invention 2.1 Goal

It is an object of the invention to overcome these different drawbacks of the prior art.

More specifically, the invention aims to solve the issues raised previously, notably the protection of systems data (which consist of BIFS-Command streams, OD-streams, MPEG-J and JPEG streams) and the conservation of MPEG-4 functionality, for instance the BIFS Update mechanism for broadcast scenes (while not increasing too much the needed bandwidth).

2.2 Main Features of the Invention

These objects as well as others which will appear subsequently, are achieved by means of a method for broadcasting multimedia signals towards a plurality of terminals as a data flow comprising successive packets, the packets being organised into sessions, a session comprising a set of packets forming a whole, at least some of said sessions being transmitted under several versions, corresponding to different starting moments.

According to the invention, such a method implements a mechanism for merging versions of a same session, so that at least two versions starting at different moments use, at first, session portions which are peculiar to them, and, subsequently, a shared session portion.

The invention also regards a method for broadcasting multimedia signals towards a plurality of terminals as a data flow comprising successive packets, the packets being organised into sessions, a session comprising a set of packets forming a whole.

According to the invention, each of said packets comprises a pointer allowing to identify, in said flow, the next packet of the corresponding session, and said flow is organised so that at least some of said packets are identified as said next packet for at least two different packets in said flow.

Advantageously, at least some of said sessions being transmitted under several versions, corresponding to different starting moments, said pointer allows to identify in said flow the next packet of the corresponding session version, and the pointers of packets belonging to different versions of a session can point towards the same next packet, so as to merge versions.

Preferentially, said pointer comprises a version identifier, which can differ from the version identifier of the present packet.

According to an advantageous feature of the invention, each of said packets comprises:
a present version identifier;
a next version identifier, which can either be:
said present version identifier; or
a different version identifier, in case of versions merging.

Preferentially, said method implements the MPEG2 standard.

Advantageously, said data are of the MPEG4 type.

The invention also regards a multimedia signal having such a structure that it can be broadcast according to the above-mentioned method.

The invention regards as well a terminal comprising means for processing a multimedia signal broadcast according to the above-mentioned method.

Advantageously, such a terminal comprises means for memorising at least some session portions received in advance.

BRIEF DESCRIPTION OF THE SEVERAL VIEWS OF THE DRAWINGS 2.3 Drawings

Other features and advantages of the invention will be more clearly apparent upon reading the following description of two preferred embodiments of the invention, given as illustrative and non-limiting examples and the appended drawings wherein:

FIG. 1, discussed in Annex 2, discloses an example of content of a scene description;

FIGS. 2a and 2b, also discussed in Annex 2, disclose two recommended temporal reception orders, according to prior art;

Figure 1:
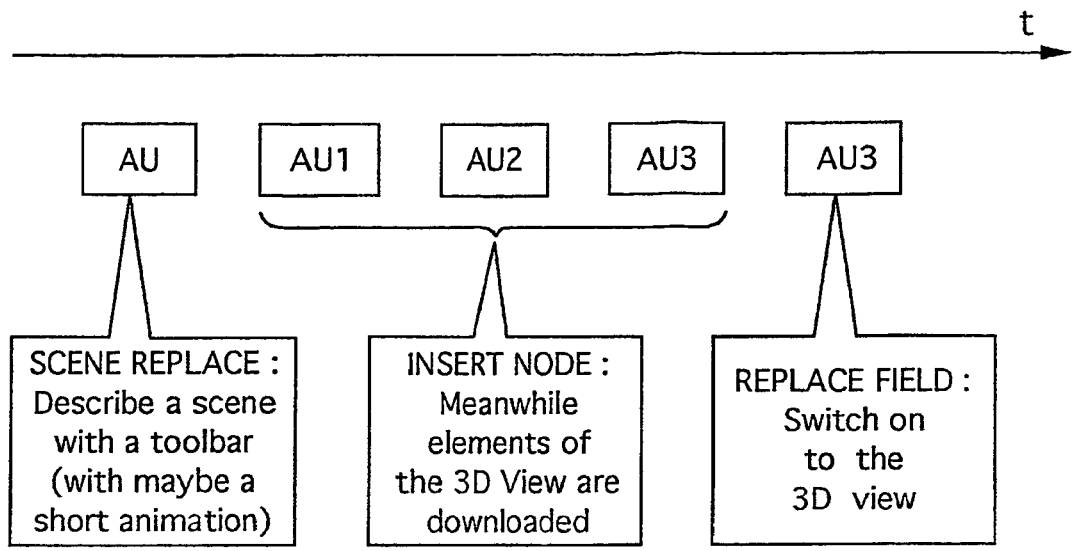

DETAILED DESCRIPTION OF ILLUSTRATIVE EMBODIMENTS 2.4 MPEG-4 Section Definition In order to address systems data, we propose to extend the definition of the MPEG-4 section. This means defining an MPEG-4 section for all the different stream types. Doing so enables us to provide the functionality of small audio sounds, small video clips, that are repeated in the broadcast session. [e.g. a beep that is repeated when you click on a button]

In the current specification, a section type has been defined for BIFS streams and OD streams. We propose to add a generic section type for all ISO/IEC 14496 content. It would be recommended not to use BIFS & OD section types from now on.

The detailed modification is described at the end of the document.

2.5 Adding a Forward Reference in the MPEG-4 Sections

2.5.1 The Mechanism

In order to address the issues raised by random access to presentations we define a forward reference mechanism in the MPEG-4 sections. This allows several connected users to experience the same dynamic presentation while sharing packets.

Let us call a session the sequence of data that provides an end-user with a presentation. Each session is associated to a single PMT.

Allowing random access to a presentation means transmitting several sessions at the same time. There are three different times to be considered transmission time, decoding time and composition time that are relevant to us. For clarity, we suppose that composition time is equal to decoding time. Decoding time and Composition time are linked to the object to be presented and to presentation. Transmission time is related to the sequence of streamed data units.

Note that the last moment in time at which an Access Unit can be received is its decoding time. It cannot arrive after its decoding time.

Our purpose is to explain how to achieve transmission of multiple sessions, that is to say, how to order data units according to their transmission time so that decoding times can be preserved across sections. This is a well-known multiplexing problem if we treat sessions independently. However in our case, we can try and factorise sent data across sessions, namely by sharing section data. This would help us reduce the required bandwidth.

In order to achieve this, we propose a forward-reference mechanism in sections: each section is numbered and refers to a next section. Thus two sections may refer to the same next section.

In order to initialise this, we signal the first section in each PMT (see at the end of the document SL_Descriptor and FMC_Descriptor) and propose new semantics for section versioning thanks to the field media_session_number (base and extension). Since updates may be sent at a high frequency we propose allocating 10 bits for this purpose. Thanks to these two changes, we are able to address the update mechanism and control which sections are to be decoded by any session.

The semantics for versioning are then:
- when acquiring the PMT, the terminal has to look for sections with media_session_number as indicated by the corresponding Descriptor (SL or FMC).
- when acquiring a section, the terminal has to look for a next section which has media_session_number as indicated by next_session_version-number

2.5.1.1 Consequences and Results.

This mechanism enables us to provide with a complete update mechanism, to share expensive resources as JPEG, MPEG-J, etc. . . .

This mechanism is completely independent from an MPEG-4 terminal: it implies modifying the application-specific part of the MPEG-2 transport de-multiplexer (that is to say the Transport Layer if we consider DMIF's formalism).

We have calculated a forward-reference pattern for sections which allows to send cyclically a small presentation. We compared the packetization produced by this mechanism as compared to a simple multiplexing scheme where sessions do not share data. The frequency at which each session started was 1 Hz, the frequency of updates was 4 Hz, and the presentation had a dozen updates. In that case the bandwith used was twice smaller using this scheme.

2.6 Modifications

TABLE 2-26

| Value | description |
|---|---|
| | table_id assignments |
| 0x00 | program_association_section |
| 0x01 | conditional_access_section (CA_section) |
| 0x02 | TS_program_map_section |
| 0x03 | TS_description_section |
| 0x04 | ISO_IEC_14496_scene_description_section |
| 0x05 | ISO_IEC_14496_object_descriptor_section |
| 0x06 | ISO_IEC_14496_generic_section |
| 0x07-0x37 | ITU-T Rec. H.222.0|ISO/IEC 13818-1 reserved |
| 0x38-0x3F | Defined in ISO/IEC 13818-6 |
| 0x40-0xFE | User private |
| 0xFF | forbidden |

Tableau 2-26 table_id Assignment Values

2.6.2 Section definition Table 2-63

| Syntax | No. of bits | Mnemonic |
|---|---|---|
| ISO_IEC_14496_section( ) { | | |
|     table_id | 8 | uimsbf |
|     section_syntax_indicator | 1 | bslbf |
|     private_indicator | 1 | bslbf |
|     reserved | 2 | bslbf |
|     ISO_IEC_14496_section_length | 12 | uimsbf |
|     table_id_extension | 16 | uimsbf |
|     reserved | 2 | bslbf |
|     media_session_number_base | 5 | uimsbf |
|     current_next_indicator | 1 | bslbf |
|     section_number | 8 | uimsbf |
|       last_section_number | 8 | uimsbf |
|       media_session_number_extension | 5 | uimsbf |
|       reserved | 6 | bslbf |
|     Next_media_session_number | 10 | uismbf |
|     reserved | 11 | uismbf |
|     if (PMT_has_SL_descriptor(current_PID)) { | | |
|         SL_Packet( ) | | |
|     } | | |
|     E l s e                  i f (PMT_has_FMC_descriptor(current_PID)) { | | |
|         for (i=1; i<N; i++) | | |
|             FlexMuxPacket( ) | | |
|     } | | |
|     Else { | | |
|         for (i=1; i<N; i++) | | |
|             reserved | 8 | bslbf |
|     } | | |
|     CRC_32 | 32 | rpchof |
| } | | |

Table 2-63—Section Syntax for Transport of ISO/IEC14496 Streams table_id—This 8-bit field shall be set to '0x04' or '0x05' or '0x06' in case of an ISO_IEC_14496_section. A value of '0x04' indicates an ISO_IEC_14496_scene_description_section that carries an ISO/IEC 14496-1 scene description stream. A value of '0x05' indicates an ISO_IEC_14496_object_descriptor_section that carries an ISO/IEC 14496-1 object descriptor stream. A value of '0x06' indicates an ISO_IEC_14496_generic_section that carries an ISO/IEC 14496-1 streams.

section_syntax_indicator—This 1-bit field shall be set to '1'.

private_indicator—This 1-bit field shall not be specified by this Specification

ISO_IEC_14496_section_length—This 12-bit field shall specify the number of remaining bytes in the section immediately following the ISO_IEC_14496_section_length field up to the end of the ISO_IEC_14496_section. The value of this field shall not exceed 4093 (0xFFD)

table_id_extension—This 16-bit field shall not be specified by this Specification; its use and value are defined by the user.

media_session_number_base—[This 5-bit field shall represent the most significant part of the media version number of the ISO_IEC_14496_table. The least significant part of the media_session_number being the media_session_number-extension. The media version number shall be incremented by 1 modulo 1024 with each new media session of the table. Media session control is at the discretion of the application.]

current_next_indicator—This 1-bit field shall be set to 1.

section_number—This 8-bit field shall represent the number of the ISO_IEC_14496_section. The section_number field of the first ISO_IEC_14496_section of the Object Descriptor Table or the Scene Description Table shall have a value equal to 0x00. The value of section_number shall be incremented by 1 with each additional section in the table.

last_section_number—This 8-bit field shall specify the number of the last section of the Object Descriptor Table or Scene Description Table of which this section is a part.

media_session_number_extension—This 5-bit field shall represent the least significant part of the media session number of the ISO-IEC-14496 Table.

next_media_session_number—This 10-bit field shall represent the next media session number of the following section which has to be acquired.

PMT_has_SL_descriptor (current_PID)—a pseudo function that shall be true if an SL descriptor is contained in the descriptor loop in the Program Map Table for the ISO/IEC 13818-1 program element that conveys this ISO_IEC_14496_section.

SL_Packet( )—a sync layer packet as specified in subclause 10.2.2 of ISO/IEC 14496-1.

PMT_has_FMC_descriptor (current_PID)—a pseudo function that shall be true if an FMC descriptor is contained in the descriptor loop in the Program Map Table for the ISO/IEC 13818-1 program element that conveys this ISO_IEC_14496_section.

FlexMuxPacket( )—a FlexMux packet as specified in subclause 11.2.4 of ISO/IEC 14496-1.

CRC_32—This 32-bit field shall contain the CRC value that gives a zero output of the registers in the decoder defined in Annex A of ITU-T Rec. H.222.0|ISO/IEC 13818-1 after processing the entire ISO_IEC_14496_section.

2.6.3 Descriptors.

2.6.3.1 SL Descriptor

| Syntax | No. of bits | Mnemonic |
|---|---|---|
| SL_descriptor ( ) { | | |
| descriptor_tag | 8 | uimsbf |
| descriptor_length | 8 | uimsbf |
| ES_ID | 16 | uimsbf |
| If (Stream-type==0x13) | | |
| { | | |
| reserved | 6 | uimsbf |
| next_media_session_number | 10 | uimsbf |
| } | | |
| } | | |

2.6.3.2 Semantic Definition of Fields in SL Descriptor

ES_ID—This 16-bit field shall specify the identifier of an ISO/IEC 14496-1 SL-packetized stream.

next_media_session_number—This field shall specify the media session of the section that has to be compiled by the terminal.

2.6.3.3 FMC descriptor

| Syntax | No. of bits | Mnemonic |
|---|---|---|
| FMC_descriptor ( ) { | | |
| descriptor_tag | 8 | uimsbf |
| descriptor_length | 8 | uimsbf |
| for (i=0; i<descriptor_length; i += 3) { | | |
| ES_ID | 16 | uimsbf |
| FlexMuxChannel | 8 | uimsbf |
| if (Stream-type==0x13) { | | |
| reserved | 6 | uimsbf |
| next_media_session_number | 10 | uimsbf |
| } | | |
| } | | |
| } | | |

2.6.3.4 Semantic Definition of Fields in FMC Descriptor

ES_ID—This 16-bit field specifies the identifier of an ISO/IEC 14496-1 SL-packetized stream.

FlexMuxChannel—This 8-bit field specifies the number of the FlexMux channel used for this SL-packetized stream.

next_media_session_number—This field shall specify the media session of the section that has to be compiled by the terminal.

2.7 Examples (FIGS. 3 to 7)

Figure 3:
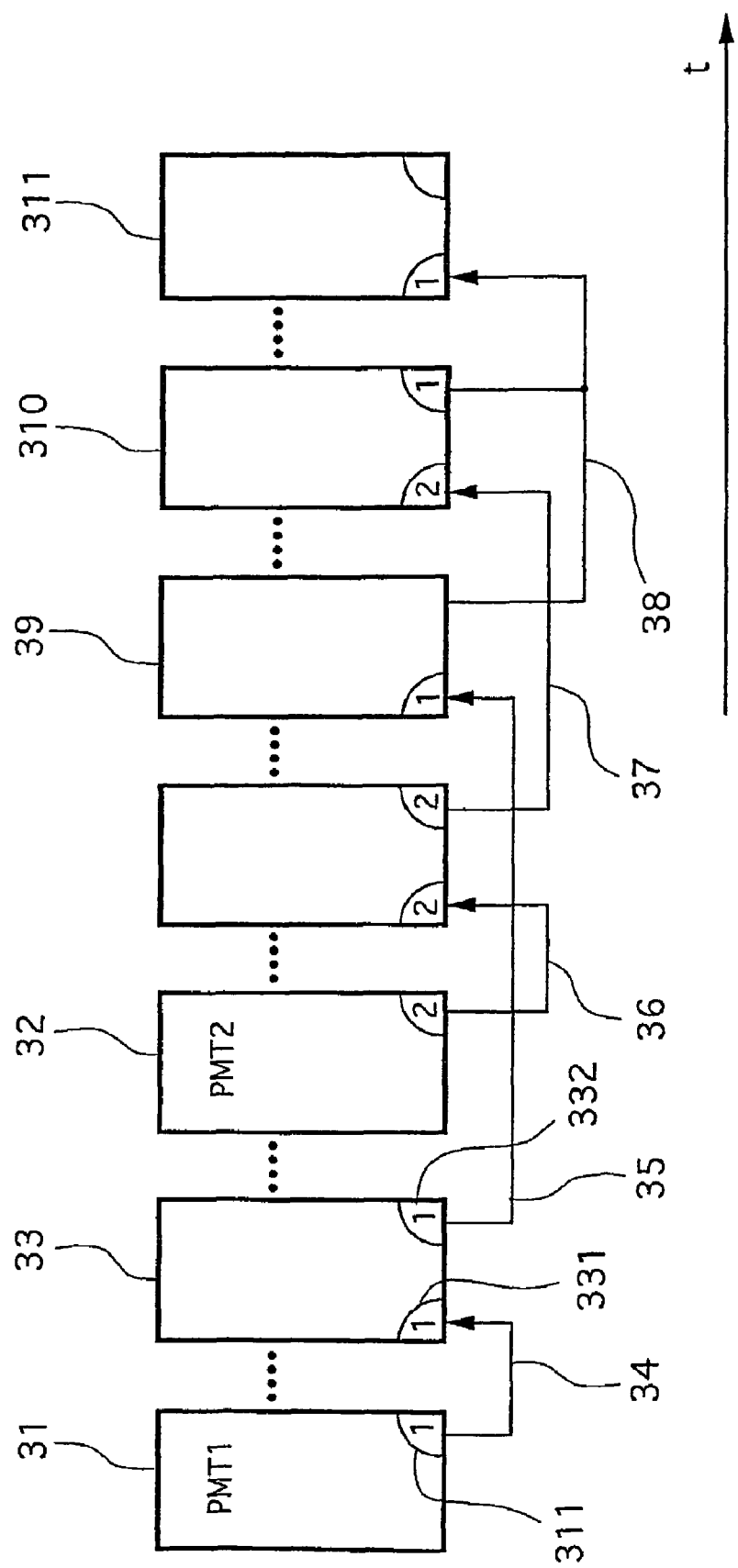
FIG. 3 illustrates the use of the method of the invention.

FIG. 3 illustrates the method of the invention, in a general way. The MPEG-2 signal comprises a first program map table (PMT) 31, describing a related session. Several similar PMT 32 (only one is illustrated) are inserted in the signal, to allow terminals to get the corresponding presentation, whenever they are connected to the signal. Each PMT 31, 32 corresponds to a different version of the session.

Therefore, the PMT 31 includes a version number 311 (version "1"), which allows the terminal to identify the following packet 33 to be taken into account in the version "1" of the session (arrow 34). In the same way, packet 33 includes:

a version number 331 (designated by the previous packet);

a next version number 332 (designating the further packet—arrow 35).

The same structure is used for the second version of the session (version "2"), from PMT 32 (arrows 36, 37).

In a first time, the next version number is generally the current version number. However, according to the invention, it is possible that the next version number designates a different version number than the current number, as shown by arrow 38. In this case, packet 39 and packet 310 (while belonging to two distinct version of the same session) will point out on a same packet 311. In other words, there is a merging of the two versions (or a jump of one of the versions).

Consequently, packet 311 will be sent only one time, although it will be used by terminals not having beginning the reception of the session at the same time. It is a very efficient way to reduce the quantity of data to be transmitted (in particular when packet 311 is a big one), and to allow quick starting at any time in the terminals.

Of course, when the terminal has started late (i.e. with PMT 32), it is possible that packet 311 is received too early (processing of the previous packets not being achieved). In this case, the terminal stores the corresponding data in a buffer, so as to postpone the processing of same.

In the same way, specific sequences (such as a jingle or a scene) which can be required at any time can be transmitted only one time (or a limited number of times) and stored in the terminal. As soon as it is required, this sequence is identified as already stored, with the version number pointing on it.

Figure 4:
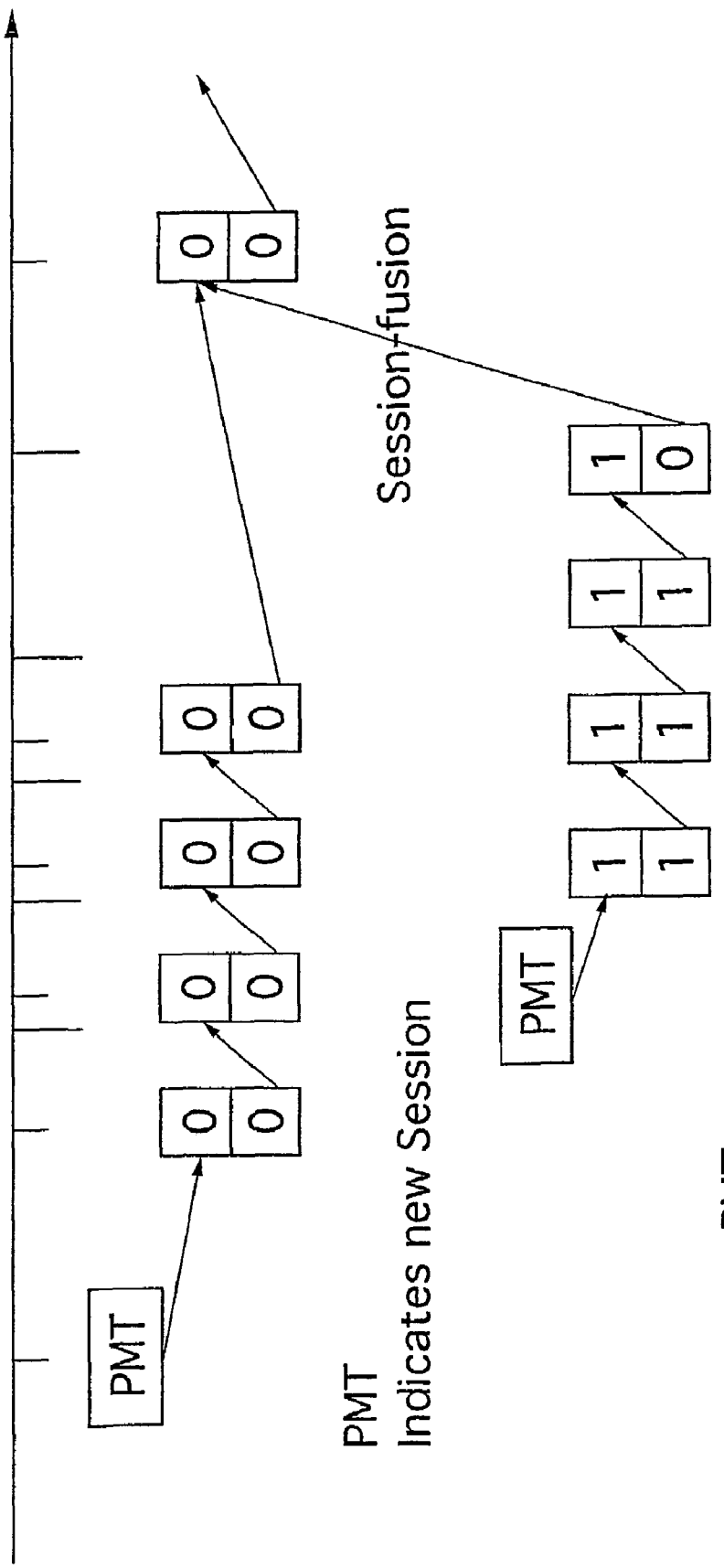
FIG. 4 illustrates how sessions interact, in a fusion of sessions.
Figure 5:
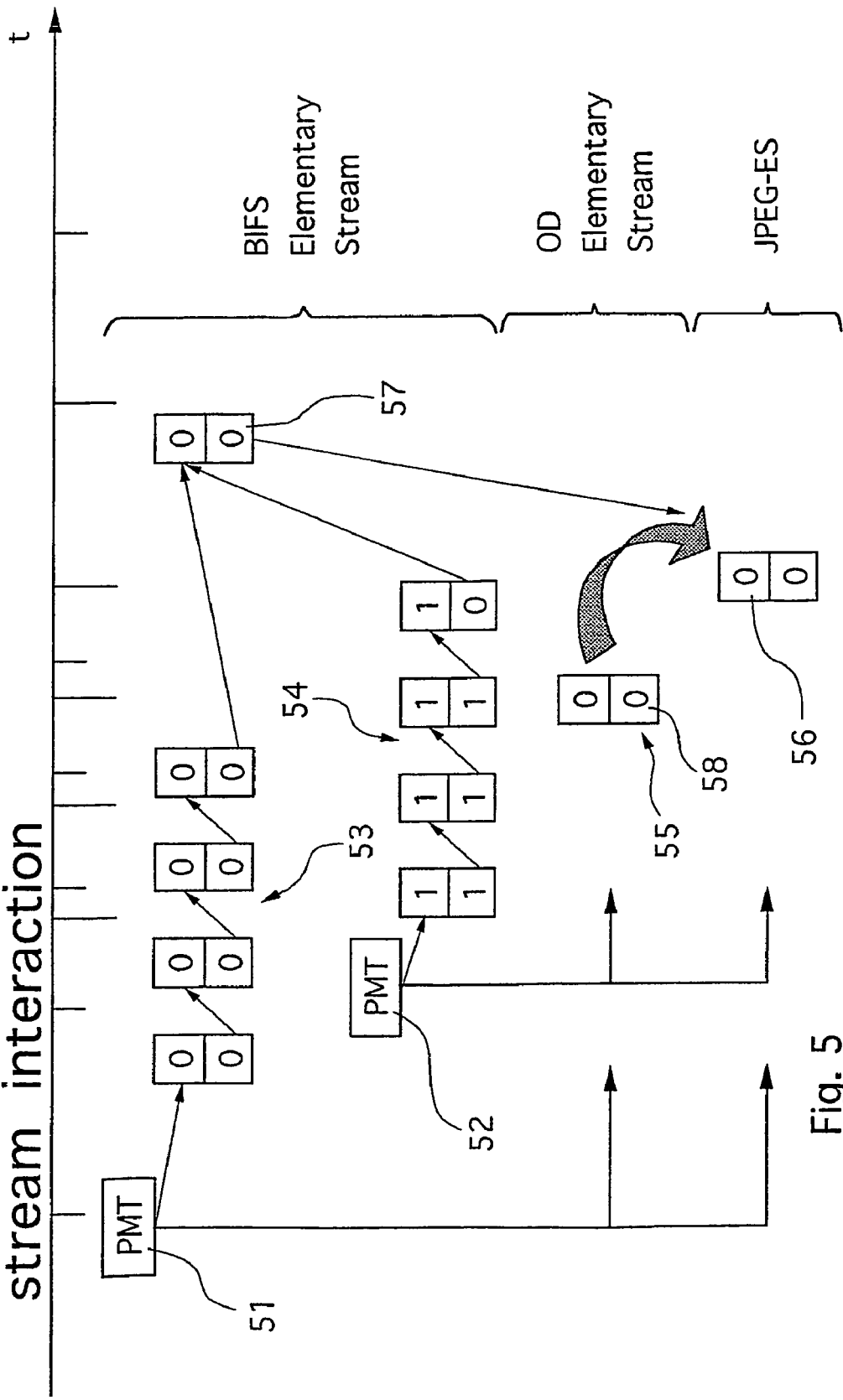
FIG. 5 illustrates how sessions interact, in the case of stream interaction.

FIG. 4 (which is similar to FIG. 3) illustrates how sessions interact, in the case of a fusion of sessions. FIG. 5 illustrates how sessions interact, in the case of a stream interaction. PMTs 51, 52 point out on a BIFS elementary stream 53, 54 (same as FIG. 4) and on an OD elementary stream 55. Moreover, a JPEG-ES stream 56 is pointed out by the packet 57 and the packet 58.

Figure 6:
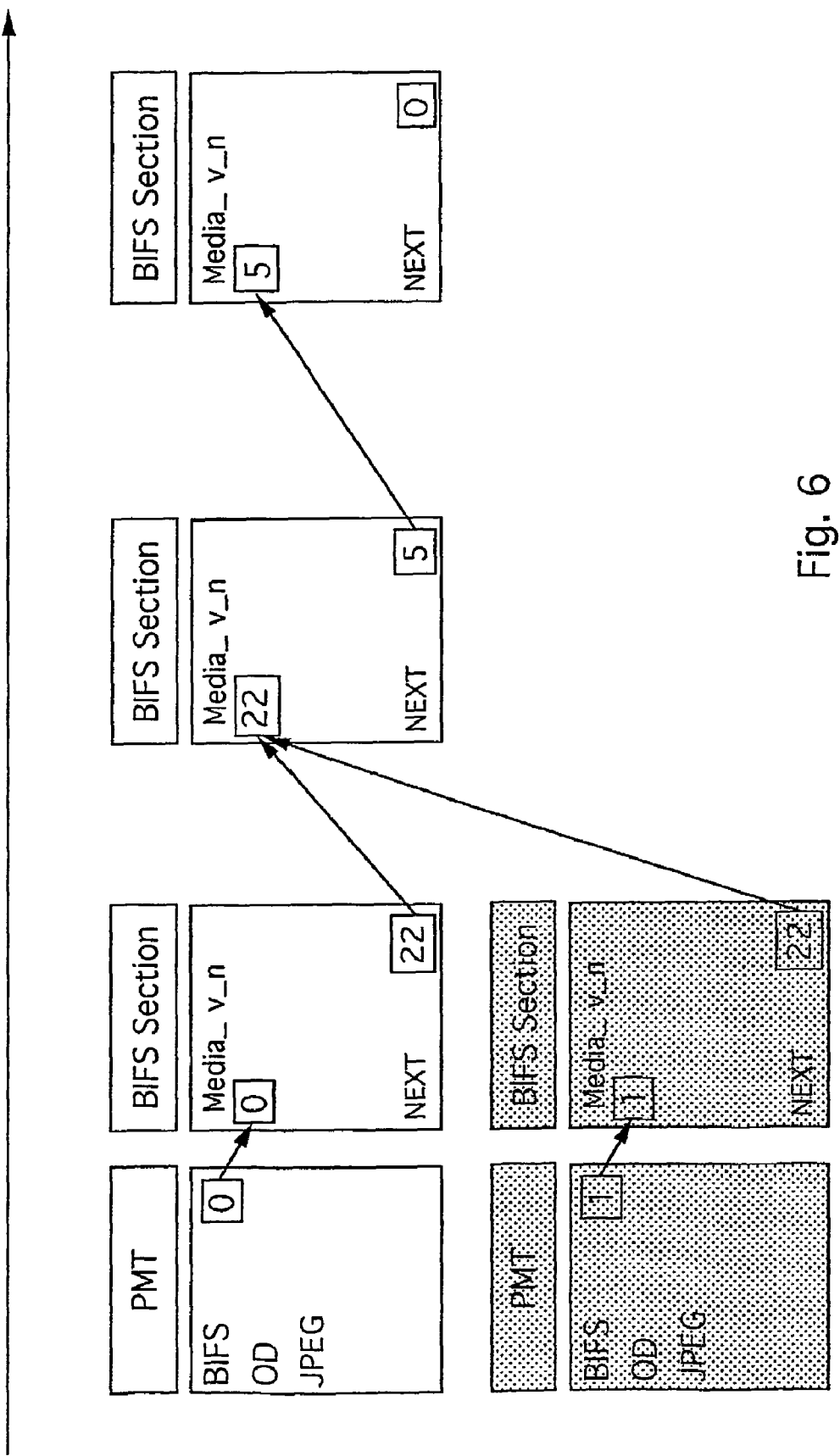
FIG. 6 illustrates the forward reference mechanism, according to the invention.
Figure 7:
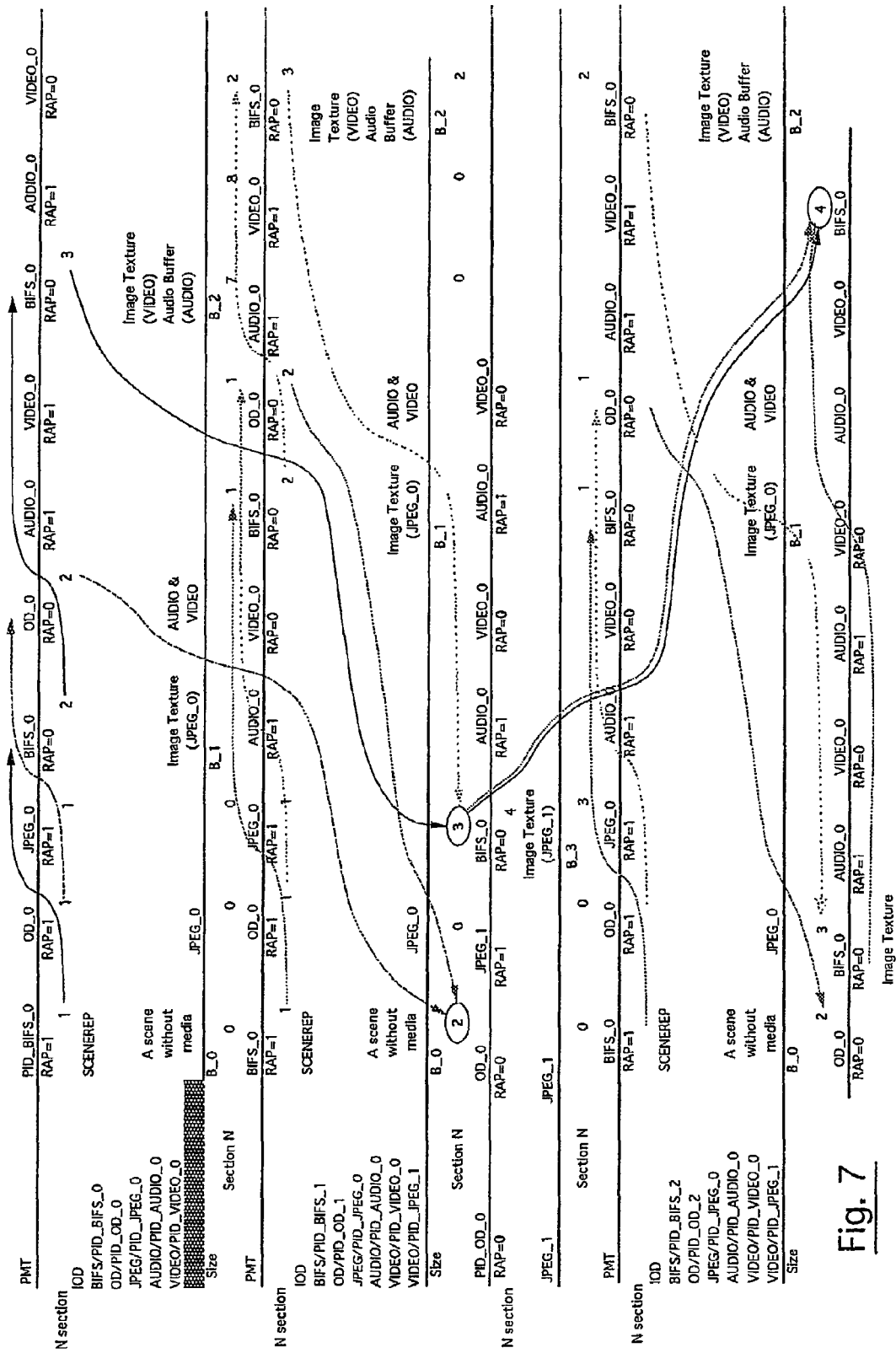
FIG. 7 is an example of the method of FIG. 6, in a MPEG2 context.

FIG. 6 is an example of structure for the forward reference mechanism, according to the invention. FIG. 7 discloses a more detailed example of use of this method, according to MPEG-2. It shows a series of packets, on a temporal axis (4 successive lines are illustrated, where the first packet of a line follows in time the last packet of the previous line).

ANNEX 1

MPEG-4 Definitions

1. Access Unit (AU)

An individually accessible portion of data within an elementary stream. An access unit is the smallest data entity to which timing information can be attributed.

2. Alpha Map

The representation of the transparency parameters associated with a texture map.

3. Audio-visual Object

A representation of a natural or synthetic object that has an audio and/or visual manifestation. The representation corresponds to a node or a group of nodes in the BIFS scene description. Each audio-visual object is associated with zero or more elementary streams using one or more object descriptors.

4. Audio-visual Scene (AV Scene)

A set of audio-visual objects together with scene description information that defines their spatial and temporal attributes including behaviors resulting from object and user interactions.

5. Binary Format for Scene (BIFS)

A coded representation of a parametric scene description format.

6. Buffer Model

A model that defines how a terminal complying with ISO/IEC 14496 manages the buffer resources that are needed to decode a presentation.

7. Byte Aligned

A position in a coded bit stream with a distance of a multiple of 8-bits from the first bit in the stream.

8. Clock Reference

A special time stamp that conveys a reading of a time base.

9. Composition

The process of applying scene description information in order to identify the spatio-temporal attributes and hierarchies of audio-visual objects.

10. Composition Memory (CM)

A random access memory that contains composition units.

11. Composition Time Stamp (CTS)

An indication of the nominal composition time of a composition unit.

12. Composition Unit (CU)

An individually accessible portion of the output that a decoder produces from access units.

13. Compression Layer layer of a system according to the specifications in ISO/IEC 14496 that translates between the coded representation of an elementary stream and its decoded representation. It incorporates the decoders.

14. Decoder

An entity that translates between the coded representation of an elementary stream and its decoded representation.

15. Decoding buffer (DB)

A buffer at the input of a decoder that contains access units.

16. Decoder configuration

The configuration of a decoder for processing its elementary stream data by using information contained in its elementary stream descriptor.

17. Decoding Time Stamp (DTS)

An indication of the nominal decoding time of an access unit.

18. Delivery Layer

A generic abstraction for delivery mechanisms (computer networks, etc.) able to store or transmit a number of multiplexed elementary streams or FlexMux streams.

19. Descriptor

A data structure that is used to describe particular aspects of an elementary stream or a coded audio-visual object.

20. DMIF Application Interface (DAI)

An interface specified in ISO/IEC 14496-6. It is used here to model the exchange of SL-packetized stream data and associated control information between the sync layer and the delivery layer.

21. Elementary Stream (ES)

A consecutive flow of mono-media data from a single source entity to a single destination entity on the compression layer.

22. Elementary Stream Descriptor

A structure contained in object descriptors that describes the encoding format, initialization information, sync layer configuration, and other descriptive information about the content carried in an elementary stream.

23. Elementary Stream Interface (ESI)

An interface modeling the exchange of elementary stream data and associated control information between the compression layer and the sync layer.

24. FlexMux Channel (FMC)

A label to differentiate between data belonging to different constituent streams within one FlexMux Stream. A sequence of data in one FlexMux channel within a FlexMux stream corresponds to one single SL-packetized stream.

25. FlexMux Packet

The smallest data entity managed by the FlexMux tool. It consists of a header and a payload.

26. FlexMux Stream

A sequence of FlexMux Packets with data from one or more SL-packetized streams that are each identified by their own FlexMux channel.

27. FlexMux tool

A tool that allows the interleaving of data from multiple data streams.

28. Graphics Profile

A profile that specifies the permissible set of graphical elements of the BIFS tool that may be used in a scene description stream. Note that BIFS comprises both graphical and scene description elements.

29. Inter

A mode for coding parameters that uses previously coded parameters to construct a prediction.

30. Intra

A mode for coding parameters that does not make reference to previously coded parameters to perform the encoding.

31. Initial Object Descriptor

A special object descriptor that allows the receiving terminal to gain initial access to portions of content encoded according to ISO/IEC 14496. It conveys profile and level information to describe the complexity of the content.

32. Intellectual Property Identification (IPI)

A unique identification of one or more elementary streams corresponding to parts of one or more audio-visual objects.

33. Intellectual Property Management and Protection (IPMP) System

A generic term for mechanisms and tools to manage and protect intellectual property. Only the interface to such systems is normatively defined.

34. Object Clock Reference (OCR)

A clock reference that is used by a decoder to recover the time base of the encoder of an elementary stream.

35. Object Content Information (OCI)

Additional information about content conveyed through one or more elementary streams. It is either aggregated to individual elementary stream descriptors or is itself conveyed as an elementary stream.

36. Object Descriptor (OD)

A descriptor that aggregates one or more elementary streams by means of their elementary stream descriptors and defines their logical dependencies.

37. Object Descriptor Command

A command that identifies the action to be taken on a list of object descriptors or object descriptor IDs, e.g., update or remove.

38. Object Descriptor Profile

A profile that specifies the configurations of the object descriptor tool and the sync layer tool that are allowed.

39. Object Descriptor Stream

An elementary stream that conveys object descriptors encapsulated in object descriptor commands.

40. Object Time Base (OTB)

A time base valid for a given elementary stream, and hence for its decoder. The OTB is conveyed to the decoder via object clock references. All time stamps relating to this object's decoding process refer to this time base.

41. Parametric Audio Decoder

A set of tools for representing and decoding speech signals coded at bit rates between 6 Kbps and 16 Kbps, according to the specifications in ISO/IEC 14496-3.

42. Quality of Service (QoS)

The performance that an elementary stream requests from the delivery channel through which it is transported. QoS is characterized by a set of parameters (e.g., bit rate, delay jitter, bit error rate, etc.).

43. Random Access

The process of beginning to read and decode a coded representation at an arbitrary point within the elementary stream.

44. Reference Point

A location in the data or control flow of a system that has some defined characteristics.

45. Rendering

The action of transforming a scene description and its constituent audio-visual objects from a common representation space to a specific presentation device (i.e., speakers and a viewing window).

46. Rendering Area

The portion of the display device's screen into which the scene description and its constituent audio-visual objects are to be rendered.

47. Scene Description

Information that describes the spatio-temporal positioning of audio-visual objects as well as their behavior resulting from object and user interactions. The scene description makes reference to elementary streams with audio-visual data by means of pointers to object descriptors.

48. Scene Description Stream

An elementary stream that conveys scene description information.

49. Scene Graph Elements

The elements of the BIFS tool that relate only to the structure of the audio-visual scene (spatio-temporal temporal positioning of audio-visual objects as well as their behavior resulting from object and user interactions) excluding the audio, visual and graphics nodes as specified in annex 1.

50. Scene Graph Profile

A profile that defines the permissible set of scene graph elements of the BIFS tool that may be used in a scene description stream. Note that BIFS comprises both graphical and scene description elements.

51. SL-Packetized Stream (SPS)

A sequence of sync layer Packets that encapsulate one elementary stream.

52. Structured Audio

A method of describing synthetic sound effects and music as defined by ISO/IEC 14496-3.

53. Sync Layer (SL)

A layer to adapt elementary stream data for communication across the DMIF Application Interface, providing timing and synchronization information, as well as fragmentation and random access information. The sync layer syntax is configurable and can be configured to be empty.

54. Sync Layer Configuration

A configuration of the sync layer syntax for a particular elementary stream using information contained in its elementary stream descriptor.

55. Sync Layer Packet (SL-Packet)

The smallest data entity managed by the sync layer consisting of a configurable header and a payload. The payload may consist of one complete access unit or a partial access unit.

56. Syntactic Description Language (SDL)

A language defined by ISO/IEC 14496-1 that allows the description of a bitstream's syntax.

57. Systems Decoder Model (SDM)

A model that provides an abstract view of the behavior of a terminal compliant to ISO/IEC 14496. It consists of the buffer model and the timing model.

58. System Time Base (STB)

The time base of the terminal. Its resolution is implementation-dependent. All operations in the terminal are performed according to this time base.

59. Terminal

A system that sends, or receives and presents the coded representation of an interactive audio-visual scene as defined by ISO/IEC 14496-1. It can be a standalone system, or part of an application system complying with ISO/IEC 14496.

60. Time Base

The notion of a clock; it is equivalent to a counter that is periodically incremented.

61. Timing Model

A model that specifies the semantic meaning of timing information, how it is incorporated (explicitly or implicitly) in the coded representation of information, and how it can be recovered at the receiving terminal.

62. Time Stamp

An indication of a particular time instant relative to a time base.

3 Abbreviations and Symbols
AU Access Unit
AV Audio-visual
BIFS Binary Format for Scene
CM Composition Memory
CTS Composition Time Stamp
CU Composition Unit
DAI DMIF Application Interface (see ISO/IEC 14496-6)
DB Decoding Buffer
DTS Decoding Time Stamp
ES Elementary Stream
ESI Elementary Stream Interface
ESID Elementary Stream Identifier
FAP Facial Animation Parameters
FAPU FAP Units
FDP Facial Definition Parameters
FIG FAP Interpolation Graph
FIT FAP Interpolation Table
FMC FlexMux Channel
FMOD The floating point modulo (remainder) operator which returns the remainder of x/y such that:
F mod(x/y)=x−k*y, where k is an integer,
sgn(f mod(x/y))=sgn(x), and
abs(f mod(x/y))<abs(y)
IP Intellectual Property
IPI Intellectual Property Identification
IPMP Intellectual Property Management and Protection
NCT Node Coding Tables
NDT Node Data Type
NINT Nearest INTeger value
OCI Object Content Information
OCR Object Clock Reference
OD Object Descriptor
ODID Object Descriptor Identifier
OTB Object Time Base
PLL Phase Locked Loop
QoS Quality of Service
SAOL Structured Audio Orchestra Language
SASL Structured Audio Score Language
SDL Syntactic Description Language
SDM Systems Decoder Model
SL Synchronization Layer
SL-Packet Synchronization Layer Packet
SPS SL-Packetized Stream
STB System Time Base
TTS Text-To-Speech
URL Universal Resource Locator
VOP Video Object Plane
VRML Virtual Reality Modeling Language

ANNEX 2

Description of a MPEG-4—Presentation

We are going to have a look at a usual MPEG-4 presentation with some JPEGs, one Audio; one Video:
IOD descriptor
System Elementary streams (BIFS & OD)
media such as JPEGs and the traditional Elementary streams

| Element | Type | ESID | NbAU | AU's average size | Comment |
|---|---|---|---|---|---|
| IOD | Descriptor | N/A | N/A | N/A | allows to start the scene |
| BIFS | ES | 1 | 10 | 5kO-50kO | first updates are "small" |
| OD | ES | 2 | 5 | 100ksO | pointing to the media |
| JPEG_1 | ES | 31 | 1 | 50kO | quite a reasonable JPEG |
| JPEG_2 | ES | 32 | 1 | 50kO | |
| JPEG_n | ES | 3n | 1 | 50kO | |
| Vidéo | ES | 41 | 1000 | 10kO | size depends on I, B, P frame |
| Audio | ES | 51 | 4000 | 1kO | |

2.1 BIFS

The presentation describes a scene that allows firstly to present a downloading tool bar (while the first elements are being downloaded) and secondly a 3D (not too complicated) scene to which will be added some updates that will bring in some video clips (see FIG. 1).

2.2 OD

The OD elementary stream contains the Object descriptors that will point to the different media (JPEG, Audio, video, . . . )

2.2.1 temporal scheduling

We try to describe the way the client should receive the different elements of the presentation:

What is needed is that media should arrive after the OD descriptors referencing them (semantics of ODExecute)

before the BIFS Update commands using them.

Figure 2A:
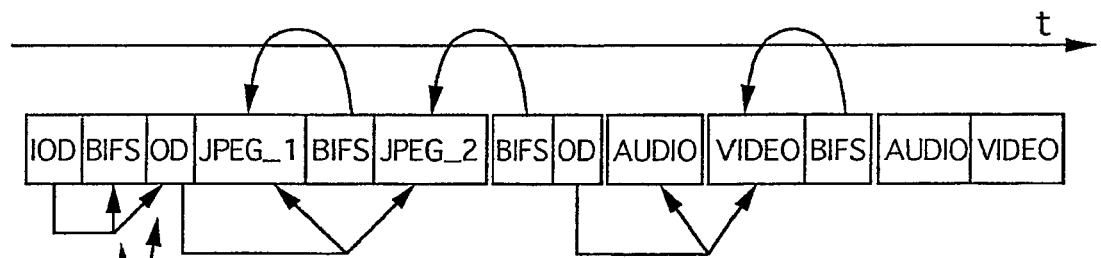
Figure 2B:
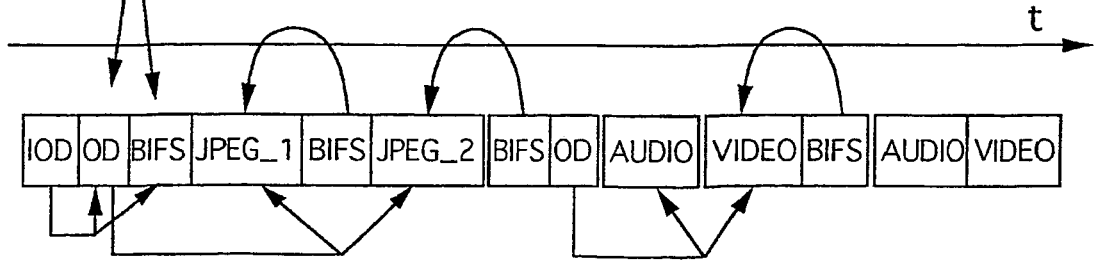

FIGS. 2a and 2b show two recommended temporal reception orders. Both are equivalent.

ANNEX 3

MPEG-4 Over MPEG-2 Mapping

MPEG-2 has two major packet structures:

the PES (Packetized Elementary Stream) packet structure the Section structure.

MPEG-4 contents can be carried within those two structures.

We are going to consider the carriage of the IOD descriptor, and the different possible carriages of the System Elementary streams (BIFS & OD)

Traditional Elementary Streams (Audio & Video)

According to the MPEG-4 specification, the System Elementary streams (BIFS & OD), and the Traditional Elementary Streams (Audio & Video) are first embedded into either the MPEG-4 SL layer or into the MPEG-4 FlexMux layer (that includes the SL layer)

JPEGs and MPEG-J will also be considered 3.1 MPEG-2 Signaling, MPEG-4 Descriptors The MPEG-2 PMT table describes any MPEG-2 program proposed to the end user. In this table the different MPEG-4 descriptors will be found, such as the IOD, the SL and FlexMux descriptors describing the different MPEG-4 streams, when needed. Since BIFS and OD Elementary streams are part of the presentation, the MPEG-4 Elementary streams are embedded within the MPEG-4 SL layer or within the FlexMux layer (including the SL layer).

The PMT table (with other service and network oriented tables) is repeated to allow a quick tuning in of any client at any moment. Usually such a table can be repeated several times a second.

The IOD is part of the TS_program_map_section of the PMT table

In the PMT the list of the MPEG-4 streams associated to the presentation follows the IOD. Each stream is characterized by its MPEG-4 descriptor.

3.1 MPEG-2 Content, MPEG-4 System and Traditional Elementary Streams:

MPEG-2 content can be either in Packetized Elementary Streams (PES) or Sections.

PES streams are sequences of PES packets. Packets are of variable length (rather long), synchronised, rather continuous, not protected. The PES syntax is a common syntax to all elementary streams to support synchronization. The first elementary streams to use the PESsyntax are the Audio & Video Elementary streams.

Sections are variable length packets (rater small), not synchronized, rather discontinuous, protected. Protected means that on reception of each section, it is possible to be aware that the section has been corrupted or not. The first use of sections is to carry signalling. Their second use is for downloading. Carousel mechanisms are based on section packetization.

All MPEG-4 streams, as system elementary streams are here present, have to be at least embedded into the MPEG-4 SL layer, to allow assignment of the MPEG-4 timestamps, or into the FlexMux layer (that includes the SL layer).

The BIFS & the OD Elementary streams, once converted into SL or FlexMux streams, can be carried either in PES or in Sections, while Audio and Video Elementary streams have always to be carried within PESs.

We will consider first both types of System Elementary streams embedded in PES, and then their embedding in Sections, associated in both cases with the Audio & Video elementary streams embedded in PES 3.2.1 First Case: System & Traditional Elementary Streams Embedded in PES The major issue is to allow at any time, any client to tune into the presentation: the random access issue.

Among other things, this can be done by the use of the RAP flag supported at the MPEG-4 SL layer, and by the use of PMT table.

3.2.1.1. The Random Access Point Flag

To support this feature, we can use the Random Access Point flag (RAP) present at the SL level, for all the Elementary streams of the presentation.

For BIFS, when RAP=1 the BIFS AU contains the integration of all the preceeding BIFS Updates. This leads eventually to a huge size of BIFS AU (#1 Mbyte). Another issue is also that to present something coherent, the player has to await for all the JPEG textures. Which is quite a lot of information, and a heavy downloading. This implies for JPEGs, that either the terminal will read only one AU, and will not pay attention to the following ones that will be sent later for further possible random access, or that the terminal will crash For OD, when RAP=1, the OD AU will contain the result and integration of the preceeding updates. Applications are less concerned by the sizes of the Ods. For Audio & Video Elementary streams, they are read continuously. Audio 'jingles' and Video 'clips' cannot be sent within such elementary streams.

The "streams with RAP" figure shows a simple scenario, using the RAP facility.

In the first case are arriving into the terminal successively:

1. BIFS (RAP=1) describing a scene without media

2. OD (RAP=1) pointing to the first JPEG

3. JPEG (RAP=1), the first JPEG,

4. BIFS (RAP=0) describing the image texture where the JPEG will be mapped

5. OD (RAP=0) to introduce the Audio and the Video, 6. the Audio and Video (their first AUs)

7. BIFS (RAP=0) describing where the Audio & Video are mapped 8. the Audio, Video (other AUs)

In the second case are arriving into the terminal successively:

1. OD (RAP=1) pointing to the first JPEG, the Audio and the Video

2. The Audio, the Video, 3. the first JPEG (RAP=1)

4. the BIFS (RAP=1) integrating the BIFS updates of the first case,

5. OD (RAP=0) pointing to the second JPEG 6. the second JPEG (RAP=1)

7. the BIFS (RAP=0) pointing to the second JPEG

8. The Audio and the Video.

In the second case, the OD is arriving first, then BIFS with RAP=1 integrates some preceding BIFS update commands.

In the third case are arriving into the terminal successively:
1. OD (RAP=1) pointing to the first JPEG and to the second JPEG, to the Audio and the Video. This OD integrates the wo OD of the second case.
2. The Audio, the Video,
3. the first JPEG (RAP=1)
4. the second JPEG (RAP=1)
5. the BIFS (RAP=1) integrating the BIFS updates of the second case,
6. The Audio and the Video.

The "different Sessions" figure, starting from the "streams with RAP" figure, tries to show from which commands a session is built from.

In the first case are arriving into the terminal successively:
In the second case are arriving into the terminal successively:
In the third case are arriving into the terminal successively:

Conclusion:
1. In fact, we rather use downloading for OD, BIFS & JPEGs while Video & Audio are continuously streamed.
2. Difficult to know where we are as far as the Scene or the OD reconstruction are concerned. No gain to have progressive downloading. Progressive loading of a scene is adding a lot of complexity, both on the receiver side and on the sender side (the server has to manage the current state of the scene).
3. 'jingle' or 'clip' are impossible.
4. a potential issue with JPEG.
5. MPEG-4 System Elementary streams are not protected.

3.2.1.1.1. Use of the PMT Table

An other solution might consist in assigning within each new PMT, new PIDs for the new streams that have to be repeated. In that case, we have to precisely define how does a terminal react when a PMT is changing. A PMT only references the streams allowing to have a complete access to a presentation. The PMT has to be completely parsed, starting with the IOD itself.

The "RAP+PMT stream of packets" figure shows a scenario, using the RAP facility that is present for the different Elementary streams, associated with the fact that the PIDs assigned to the MPEG-4 system elementary streams are changing at each instance of the PMT table.

In the first case are arriving, according to the first PMT PID assignments, into the terminal successively:

1. BIFS (RAP=1) describing a scene without media, under the PID BIFS_0.

2. OD (RAP=1) pointing to the fisrt JPEG, under the PID OD_0.

3. JPEG (RAP=1), the first JPEG,

4. BIFS (RAP=0) describing the image texture where the JPEG will be mapped

5. OD (RAP=0) to introduce the Audio and the Video, 6. the Audio and Video

7. BIFS (RAP=0) describing where the Audio & Video are mapped 8. the Audio, Video The second case is a continuation of the first case. A second PMT has been sent to start a new session, and hence the session established with pte precedin PMT and the new sessionestablishes by this new PMT will live together are arriving into the terminal successively:

1. BIFS (RAP=1) describing a scene without media, under the PID BIFS_1.

2. OD (RAP=1) pointing to the first JPEG, under the PID OD_1.

3. JPEG (RAP=1), the first JPEG,

4. The Audio, the Video, 5. the BIFS (RAP=0), under the PID BIFS_1, pointing to the second JPEG 6. OD (RAP=0), under PID OD_1, pointing to the Audio & Video 7. The Audio, the Video, 8. the BIFS (RAP=0), under PID BIFS_1 pointing to the Audio & Video 9. Then the OD and BIFS of both the sessions are interleaved.

In the third case are arriving into the terminal successively:

10. BIFS (RAP=1) describing a scene without media, under the PID BIFS_2.

11. OD (RAP=1) pointing to the first JPEG, under the PID OD_2.

12. JPEG (RAP=1), the first JPEG,

13. The Audio, the Video, 14. the BIFS (RAP=0), under the PID BIFS_2, pointing to the second JPEG 15. OD (RAP=0), under PID OD_2, pointing to the Audio & Video 16. The Audio, the Video, 17. the BIFS (RAP=0), under PID BIFS_2 pointing to the Audio & Video 18. Then the OD and BIFS of both the sessions are interleaved.

The "RAP+PMT packet stream" figure, starting from the "RAP+PMT stream of packets" figure, shows whare duplication of BIFS and OD Access Unit occur.

Conclusion:
It might be possible to support a progressive download, with a waste of PIDs (for a scene duration)
BIFS and OD Updates have to be duplicated with different PIDs (except for Video & audio)
Audio 'jingle' and Video 'clip' are also not possible.
Protection is not supported for MPEG-4 System Elementary streams.

3.2.2 Traditional Elementary Streams Remain into PES, but BIFS and OD are embedded into Sections.

In such a scenario, the BIFS & OD are protected (their corruption can be detected).

BIFS and OD Updates are carried under different tables and sections. To each BIFS and OD Update, a version number will be assigned. The version number will change.

Traditionally, when a terminal is taking care of a particular table, it has only to read the incoming tables and check if the associated version number has changed or not. When it has not changed, the terminal can avoid compiling the table. When the version number has changed, the terminal has to compile the table.

However the exact way the version number is managed is application dependent.

Remarks: JPEG have to be carried into PES, MPEG-J also, as the standard does not provide sections for those streams.

Hypothesis:

We keep the same semantic as described just before. We can insert in the new section (identified by a new version number), all the SL packets that correspond to the BIFS of a new session.

Assets:

With such a mechanism, progressive download is made possible.

BIFS & OD corruption can be detected.

Simple insertion of BIFS & OD. [each session has its proper time line]

Drawbacks:

For each session complete duplication of BIFS & OD sections

Multiple-SL sections ? [we may enforce one SL packet per section-unit]

Potential sync problem between BIFS & OD [can be solved]

The current specification does not allow MPEG-J and JPEG in sections ?

The invention claimed is:

1. A method for broadcasting multimedia signals towards a plurality of terminals as a data flow comprising successive packets, comprising:
   organizing the packets into sessions, a session comprising a set of packets forming a whole,
   transmitting at least one of the sessions under several versions, the several versions of a same session corresponding to different starting moments,
      wherein each version of a session comprises a program map table including a version identifier, which allows a terminal to identify the following packet to be taken into account, each of the packets comprising:
         a present version identifier; and
         a next version identifier, which can either be:
            the present version identifier; or
            a different version identifier, in case of versions merging, and
   merging versions of a same session, so that at least two versions starting at different moments use, at first, session portions which are peculiar to them, and, subsequently, a shared session portion.

2. The method according to claim 1, implementing the MPEG2 standard.

3. The method according to claim 1, wherein the data are MPEG4 data.

4. A method for broadcasting multimedia signals towards a plurality of terminals as a data flow comprising successive packets, comprising:
   organizing the packets into sessions, a session comprising a set of packets forming a whole,
   transmitting at least one of the sessions under several versions, the several versions of a same session corresponding to different starting moments,
      wherein each version of a session comprises a program map table including a version identifier, which allows a terminal to identify the following packet to be taken into account, and wherein each of the packets comprises a pointer allowing to identify, in the flow, the next packet of the corresponding session, each of the packets comprising:
         a present version identifier; and
         a next version identifier, which can either be:
            the present version identifier; or
            a different version identifier, and
   organizing the flow so that at least some of the packets are identified as the next packet for at least two different packets in the flow.

5. The method according to claim 4, wherein the pointer allows to identify in the flow the next packet of the corresponding session version,
and wherein the pointers of packets belonging to different versions of a session can point towards the same next packet, so as to merge versions.

6. The method according to claim 5, wherein the pointer comprises a version identifier, which can differ from the version identifier of the present packet.

7. The method according to claim 4, implementing the MPEG2standard.

8. The method according to claim 4, wherein the data are MPEG4 data.

9. A terminal for processing a multimedia signal broadcast towards a plurality of terminals as a data flow comprising successive packets, wherein the packets are organised into sessions, a session comprising a set of packets forming a whole, at least some of the sessions being transmitted under several versions, corresponding to different starting moments, versions of a same session are merged, so that at least two versions starting at different moments use, at first, session portions which are peculiar to them, and, subsequently, a shared session portion, and wherein said terminal comprises:
   means for acquiring a Program Map Table (PMT) corresponding to a current version of at least one of the sessions, said program map table including a version identifier;
   means for identifying a following packet to be taken into account in said current version of said session, as a function of said version identifier of the Program Map Table, said packet belonging either to said current version or to another version of said session; and
   means for decoding said packet and for composing a corresponding representation.

10. The terminal according to claim 9, comprising means for memorizing at least some session portions received in advance.

11. A terminal for processing a multimedia signal broadcast towards a plurality of terminals as a data flow comprising successive packets, wherein the packets are organised into sessions, a session comprising a set of packets forming a whole, wherein each of the packets comprises a pointer allowing to identify, in the flow, the next packet of the corresponding session, wherein the flow is organised so that at least some of the packets are identified as the next packet for at least two different packets in the flow, and wherein said terminal comprises:

means for acquiring a Program Map Table (PMT) corresponding to a current version of at least one of the sessions, said program map table including a version identifier;

means for identifying a following packet to be taken into account in said current version of said session, as a function of said version identifier of the Program Map Table, said packet belonging either to said current version or to another version of said session; and means for decoding said packet and for composing a corresponding representation.

12. The terminal according to claim 11, comprising means for memorizing at least some session portions received in advance.

* * * * *

UNITED STATES PATENT AND TRADEMARK OFFICE
CERTIFICATE OF CORRECTION

| | | |
|---|---|---|
| PATENT NO. | : 7,398,543 B2 | Page 1 of 1 |
| APPLICATION NO. | : 10/483689 | |
| DATED | : July 8, 2008 | |
| INVENTOR(S) | : Cotarmanac'h et al. | |

It is certified that error appears in the above-identified patent and that said Letters Patent is hereby corrected as shown below:

In the Claims

Column 20:

In claim 7, line 28, delete "MPEG2standard." and insert --MPEG2 standard.--

Signed and Sealed this
Thirtieth Day of June, 2015

Michelle K. Lee
*Director of the United States Patent and Trademark Office*